(12) United States Patent
Choi et al.

(10) Patent No.: US 9,990,622 B2
(45) Date of Patent: Jun. 5, 2018

(54) AUTHENTICATION AND PAYMENT SYSTEM AND METHOD USING MOBILE COMMUNICATION TERMINAL

(75) Inventors: Jun-Won Choi, Gyeonggi-do (KR); Joo-Mun Lee, Gyeonggi-do (KR); Se-Hyun Oh, Seoul (KR); Myung-Sung Lee, Seoul (KR); Whan-Chul Kim, Seoul (KR)

(73) Assignee: SK Planet Co., Ltd., Seongnam-Si, Gyeonggi-Do (KR)

( * ) Notice: Subject to any disclaimer, the term of this patent is extended or adjusted under 35 U.S.C. 154(b) by 1564 days.

(21) Appl. No.: 11/574,201

(22) PCT Filed: Aug. 24, 2005

(86) PCT No.: PCT/KR2005/002785
§ 371 (c)(1),
(2), (4) Date: Oct. 24, 2007

(87) PCT Pub. No.: WO2006/022513
PCT Pub. Date: Mar. 2, 2006

(65) Prior Publication Data
US 2008/0189186 A1 Aug. 7, 2008

(30) Foreign Application Priority Data
Aug. 25, 2004 (KR) .................. 10-2004-0067261
Dec. 7, 2004 (KR) .................. 10-2004-0102456

(51) Int. Cl.
*G06Q 20/32* (2012.01)
*G06Q 20/12* (2012.01)
(Continued)

(52) U.S. Cl.
CPC .............. *G06Q 20/32* (2013.01); *G06Q 20/12* (2013.01); *G06Q 20/20* (2013.01); *G06Q 20/322* (2013.01);
(Continued)

(58) Field of Classification Search
CPC ........ G06Q 20/32; G06Q 20/12; G06Q 20/20; G06Q 20/322; G06Q 20/3255;
(Continued)

(56) References Cited

U.S. PATENT DOCUMENTS

2001/0029472 A1* 10/2001 Hataguchi .............. G06Q 30/06
705/26.42
2001/0032878 A1* 10/2001 Tsiounis ................. G06Q 20/02
235/379

(Continued)

FOREIGN PATENT DOCUMENTS

| CN | 1395716 A | 2/2003 |
|----|-----------|--------|
| CN | 1430377 A | 7/2003 |

(Continued)

OTHER PUBLICATIONS

A Guide for Using Paypal in Your Business. PayPal Merchant Tools. May 21, 2013.*

(Continued)

*Primary Examiner* — Michael Misiaszek
*Assistant Examiner* — Katherine L O'Sullivan
(74) *Attorney, Agent, or Firm* — Fenwick & West LLP

(57) ABSTRACT

Disclosed herein are an authentication and payment system and method. The authentication and payment system of the present invention includes an issuer server, an issuer information management intermediate server, an acquirer server and a payment server. The issuer server issues, manages and operates payment means. The issuer information management intermediate server manages URL information required to access domestic and foreign issuer servers. The acquirer server performs payment approval and performs acquisition and settlement for member stores. The payment server intermediates between the issuer server and the acquirer server to provide an authentication and payment (Continued)

service in response to a request from a terminal of the merchant. Accordingly, the present invention can provide a safe and convenient payment process with respect to payment means, such as credit cards, electronic money or mobile phone micro payment that can be selected between a purchaser and a merchant.

5 Claims, 7 Drawing Sheets

(51) Int. Cl.
    *G06Q 20/20*     (2012.01)
    *G06Q 20/40*     (2012.01)
    *G06Q 30/06*     (2012.01)

(52) U.S. Cl.
    CPC ......... *G06Q 20/3255* (2013.01); *G06Q 20/40* (2013.01); *G06Q 30/06* (2013.01); *G06Q 30/0609* (2013.01)

(58) Field of Classification Search
    CPC .... G06Q 20/40; G06Q 30/06; G06Q 30/0601; G06Q 30/0609
    USPC ................................... 705/26, 27, 26.1, 27.1
    See application file for complete search history.

(56) References Cited

U.S. PATENT DOCUMENTS

2002/0016765 A1*  2/2002  Sacks .................... G06Q 20/02
                                                        705/39
2002/0019781 A1*  2/2002  Shooks .................. G06Q 20/00
                                                        705/26.42
2004/0167851 A1*  8/2004  Knowles et al. ................ 705/39
2005/0256806 A1*  11/2005  Tien et al. ....................... 705/64

FOREIGN PATENT DOCUMENTS

| | | |
|---|---|---|
| CN | 1437741 A | 8/2003 |
| JP | 2002-298054 A | 10/2002 |
| KR | 10-2003-0082056 | 10/2003 |
| KR | 1020030082086 | 10/2003 |
| KR | 1020030082086 A | 10/2003 |
| KR | 1020030082090 | 10/2003 |
| KR | 1020030082090 A | 10/2003 |
| KR | 1020040027232 | 4/2004 |
| KR | 1020040027232 A | 4/2004 |
| KR | 10-2004-0060909 | 7/2004 |
| KR | 1020040060909 | 7/2004 |
| KR | 1020040060909 A | 7/2004 |
| WO | 99/44114 | 9/1999 |

OTHER PUBLICATIONS

Schneider, Ivan, "iPrivacy helps take the worry out of online shopping." Bank Systems & Technology; Dec. 2000; 37, 12; ProQuest Central p. 54 (Year: 2000).*
Office Action in European Patent Application No. 12 198 342.3, dated Aug. 28, 2015.
Office Action in Chinese Patent Application No. 201410387854.X, dated Nov. 1, 2016.
Chinese Second Office Action, Chinese Application No. 201410387854.X, May 15, 2017, 16 pages.

* cited by examiner

AUTHENTICATION AND PAYMENT SYSTEM AND METHOD USING MOBILE COMMUNICATION TERMINAL

BACKGROUND OF THE INVENTION

Field of the Invention

The present invention relates, in general, to an authentication and payment system and method using a mobile communication terminal and, more particularly, to an authentication and payment system and method using a mobile communication terminal, which separately processes authentication and approval using the terminal of a merchant (a mobile communication terminal, wired terminal or terminal connected via a leased line) and the mobile communication terminal of a purchaser without leaking payment information about the purchaser, in direct sales transactions between a merchant and a purchaser offline and mail order sales transactions using multimedia or printed media, such as terrestrial broadcasting, satellite broadcasting or catalogs.

Description of the Related Art

The development of computers and information and communication technology has been rapidly progressing to an extent that no one could have predicted. Therefore, no one can predict the time and place when and where new technology will emerge. In particular, developments in virtual space have been incredible. Commercial transactions are performed in Internet space as well as education, conferences, exhibitions and medical examinations. Therefore, the most advanced information and communication technology is rapidly influencing the everyday life of human beings to the extent that people now live in an information oriented society, not in an industrial society.

Recently, countries and enterprises all over the world have concentrated on electronic commerce in Internet and cyber shopping malls providing electronic commerce. Cyber shopping malls are advantageous in that the provision of commodity information, payment processing and even delivery, in the case of digital media products, can be processed together without temporal or spatial restrictions or distance limitations. Therefore, cyber shopping malls provide advantages such as convenience and time savings to consumers, and provide advantages such as cost reduction attributable to the simplification of distribution stages and the publicity of enterprises at low cost to the enterprises, thus allowing consumers and enterprises to make use of cyber shopping malls.

As electronic commerce continuously progresses in this way, payment methods have rapidly broadened. Payment on the Internet has mostly been performed using credit cards and online deposits. However, recently, new payment means using mobile phones or a wired/wireless Audio Response System (ARS) have emerged, and have rapidly become popularized.

In particular, as a general trend towards paid content emerges, micro payment services greatly increase as a means for making payments for content below 1,000 Won. Among the above micro payment services, a payment service using wired/wireless telephones is widely used, especially by the younger generation, due to the advantage that payment is easily made and convenient after the purchase of a commodity through a small transaction. Therefore, recently, the use of payment services using wired/wireless telephones has gradually increased, while the use of payment through on-line deposits has gradually decreased.

Currently, various systems and methods are applied to an electronic payment system using the Internet according to various authentication and approval procedures. Among the systems and methods, a Secure Socket Layer (SSL)-based electronic payment system is a scheme of encrypting payment information and payment authentication information about a user and transferring the encrypted information to a shopping mall, an issuer, etc. using the SSL. The SSL-based electronic payment system can be developed and applied relatively easily, but it is problematic in that security is low and a method of authenticating a card holder requires separate payment authentication information.

Further, Secure Electronic Transaction (SET), published in 1997 to strengthen low security, performs double encryption on the basis of a certificate of authentication (including a user's personal certificate) so as to prevent the leakage of payment information, thus increasing security and guaranteeing stability. However, SET is problematic in that the system is too complicated to implement, so that SET is not widely used.

Recently, a method of separating a user authentication process for an issuer and a payment authorization process to allow responsibility for user authentication to be assumed by an issuer and to allow the issuer to directly participate in a payment process has been used. For this method, authentication payment services, such as Verified by VISA of VISA, SecureCode of MasterCard and J/Secure of JCB that make use of a 3-D Secure protocol have recently been provided to credit card member companies. A separate certificate-based electronic payment service is domestically provided along with the authentication payment services to meet the requirements of legal systems.

In the meantime, in offline payment, a chip-based credit card (a smart card-based credit card employing Europay, MasterCard, Visa (EMV) standard) that has improved security and stability to prevent the forgery and illegal use of typical magnetic credit cards has been introduced. Such a technical requirement and variations thereof were the solution of VISA, MasterCard and member companies to prevent the rapidly increasing illegal use of card payment information through reproduction and forgery.

However, the introduction of new user authentication technology on/offline has still not been applied to some service business fields due to the characteristics of typical transactions.

Those service business fields include direct sales and door-to-door sales for performing payment for transaction and contracts between a purchaser and a merchant. In the process of purchasing door-to-door sales, allowing a purchaser to purchase a commodity from a merchant face-to-face, and the process of purchasing mail order sales using telephone calls, the purchaser verbally communicates payment information, such as credit card information, to the merchant, and the merchant requests payment approval using the received payment information of the purchaser without authenticating the purchaser, thus completing a payment process.

A transaction method of allowing a service provider to make a special contract with a credit card company as a member store, to draw up a sales slip using only a credit card number, a credit card validity period, or part of a resident registration number by hand without a separate authentication process, and to bill a credit card company for the credit sale price without obtaining the signature of a consumer on the sales slip, according to the method of conducting a transaction in the case of telemarketing, includes mail order sales, direct door-to-door sales, etc. This transaction is designated as a hand-written transaction, and member stores using the hand-written transaction can be classified as 'hand-written transaction member stores'.

A payment process using hand-written sales slips in direct door-to-door sales and mail order sales is problematic in that a separate authentication process for payment information about a purchaser is not executed, and, in addition, important payment information about the purchaser is inevitably leaked to the merchant during a payment process.

In the meantime, mail order sales or direct sales fields using the hand-written transaction are problematic in that they cannot include a separate authentication process due to the method of the transactions, and always include the risk of leaking payment information, thus causing direct financial loss to purchasers.

Further, hand-written transaction member stores are additionally problematic in that they must deposit in a financial institution a certain amount within a credit limit for security proportional to the risk of hand-written transactions, so that the initial investment burden is increased, it is difficult to ensure the stability of business, and a financial institution levies additional separate financial management charges to maintain and manage hand-written transaction member stores, the reliability of which are not yet ensured.

SUMMARY OF THE INVENTION

Accordingly, the present invention has been made keeping in mind the above problems occurring in the prior art, and an object of the present invention is to provide an authentication and payment system and method using a mobile communication terminal, which separately processes authentication and approval using the terminal of a merchant (a mobile communication terminal, wired terminal or terminal connected via a leased line) and the mobile communication terminal of a purchaser without leaking payment information about the purchaser, in direct sales transactions between a merchant and a purchaser offline and mail order sales transactions using multimedia or printed media, such as terrestrial broadcasting, satellite broadcasting or catalogs, and which provides a safe and convenient payment process in an offline member store having a disadvantage in that it is impossible to install a payment terminal, or in that the installation of the terminal is expected to be economically inefficient due to local and transactional characteristics, or a small-scale member store such as a vending machine.

In order to accomplish the above object, the present invention provides an authentication and payment system for performing direct sales transactions offline between a merchant and a purchaser and mail order sales transactions using multimedia or printed media, such as terrestrial broadcasting, satellite broadcasting or catalogs, using a purchaser's mobile communication terminal capable of receiving messages and performing wireless Internet connection, the authentication and payment system including an issuer server for issuing, managing and operating payment means such as a credit card, electronic money, mobile phone micro payment means or a direct debit from a bank account; an acquirer server for performing payment approval and performing acquisition and settlement for member stores; and a payment server for intermediating between the issuer server and the acquirer server to provide an authentication and payment service in response to a request from the terminal of the merchant.

The payment server is operated so that, if it receives payment information including a mobile communication terminal number of the purchaser and transaction purchase information, other than payment authentication information about the purchaser, the payment server performs a procedure, in cooperation with the issuer server, of confirming whether the purchaser has subscribed to an authentication service, transmits a callback URL message (Short message Service: SMS or Multimedia Messaging Service: MMS message), including URL information required to access the payment server, to the purchaser's mobile communication terminal. The payment server confirms purchase details, including a payment amount, and the payment information of the purchaser if the purchaser's mobile communication terminal accesses the payment server through a callback function of the callback URL message, receives payment authentication information about the purchaser, such as a password, Personal Identification Number (PIN), or chip authentication cryptogram, and transmits payment information, including the received payment authentication information, purchase information and payment means information, to the issuer server, and requests payment authentication.

The payment server transmits authentication results received from the issuer server and the payment information received from the merchant terminal to the acquirer server to allow the acquirer server to approve payment if the issuer server authenticates a corresponding transaction and transmits the authentication results indicating whether authentication succeeded.

The issuer server is operated so that it transmits a response when the payment server requests the issuer server to confirm whether the purchaser has subscribed to the authentication service, and the issuer server compares the received payment authentication information with payment authentication information that was previously registered and stored at the time of issuing payment means, to process authentication, and transmits results indicating whether authentication succeeded to the payment server, if the payment information, including the payment authentication information, purchase information and payment means information, is received from the payment server and payment authentication is requested.

The acquirer server processes payment approval for a corresponding transaction if a payment approval request containing positive authentication results, obtained by the issuer server, is received from the payment server.

Further, the present invention provides an authentication and payment system for performing direct sales transactions offline between a merchant and a purchaser and mail order sales transactions using multimedia or printed media, such as terrestrial broadcasting, satellite broadcasting or catalogs, using a purchaser's mobile communication terminal capable of receiving messages and performing wireless Internet connection.

The authentication and payment system includes an issuer server for issuing, managing and operating payment means, an issuer information management intermediate server for managing URL information required to access domestic and foreign issuer servers, an acquirer server for performing payment approval and performing acquisition and settlement for member stores, and a payment server for intermediating between the issuer server and the acquirer server to provide an authentication and payment service in response to a request from a terminal of the merchant.

The payment server is operated so that, if it receives payment information including a mobile communication teal number of the purchaser and transaction purchase information, other than payment authentication information about the purchaser, the payment server transmits a callback URL message (SMS or MMS message), including URL information required to access the payment server, to the purchaser's mobile communication terminal.

The payment server acquires URL information required to access the issuer server of the corresponding payment means from the issuer information management intermediate server, transmits the issuer server access URL information to the purchaser's mobile communication terminal, connected to the payment server, through a callback function of the callback URL message, so that the purchaser's mobile communication terminal may perform the authentication process with the issuer server.

The payment server transmits the authentication results together with the payment information, received from the merchant terminal, to the acquirer server to allow payment approval to be performed by the acquirer server if positive authentication results are received from the issuer server.

The issuer information management intermediate server transmits URL information required to access the issuer server of the corresponding payment means to the payment server if the payment means information is received from the payment server.

The issuer server is operated so that, if the purchaser's mobile communication terminal accesses the issuer server using the issuer server access URL, the issuer server requests the purchaser's mobile communication terminal to input and transmit payment authentication information about the payment means, compares the received payment authentication information with payment authentication information that was previously registered and stored at the time of issuing the payment means, and then authenticates a corresponding transaction.

The acquirer server processes approval using authentication results if the authentication results are received from the payment server.

Further, the present invention provides an authentication and payment system for performing direct sales transactions offline between a merchant and a purchaser and mail order sales transactions using multimedia or printed media, such as terrestrial broadcasting, satellite broadcasting or catalogs, using a purchaser's mobile communication terminal capable of receiving messages and performing wireless Internet connection.

The authentication and payment system includes a payment server for intermediating between an issuer server that issues, manages and operates payment means in response to a request from a terminal of the merchant, and an acquirer server that performs payment approval and performs acquisition and settlement for member stores, thus providing an authentication and payment service.

The payment server comprises a callback URL message transmission unit for generating a callback URL message (SMS or MMS message), including URL information to allow the purchaser's mobile communication terminal to access the payment server and transmitting the callback URL message to the purchaser's mobile communication terminal, if the payment server receives payment information including the mobile communication terminal number of the purchaser and transaction purchase information, other than payment authentication information about the purchaser, from the merchant terminal; a payment information confirmation unit for confirming purchase details of the purchaser, including a payment amount and payment information in cooperation with the purchaser's mobile communication terminal if the purchaser's mobile communication terminal accesses the payment server through the callback function of the callback URL message; and an authentication result reply unit for requesting the purchaser's mobile communication terminal to input payment authentication information if the payment information has been confirmed, transmitting payment information, including corresponding purchase information and payment means information, and payment authentication information to the issuer server and requesting payment authentication from the issuer server if the payment authentication information has been received, and transmitting authentication results together with the payment information, received from the merchant terminal, to the acquirer server to allow payment approval to be performed by the acquirer server if positive authentication results are received from the issuer server.

Further, the present invention provides an authentication and payment system for performing direct sales transactions offline between a merchant and a purchaser and mail order sales transactions using multimedia or printed media, such as terrestrial broadcasting, satellite broadcasting or catalogs, using a purchaser's mobile communication terminal capable of receiving messages and performing wireless Internet connection.

The authentication and payment system includes a payment server for intermediating between an issuer server that issues, manages and operates payment means in response to a request from a terminal of the merchant, an issuer information management intermediate server that manages URL information required to access domestic and foreign issuer servers, and an acquirer server that performs payment approval and performs acquisition and settlement for member stores, thus providing an authentication and payment service.

The payment server comprises, a callback URL message transmission unit for generating a callback URL message (SMS or MMS message), including URL information to allow the purchaser's mobile communication terminal to access the payment server, and transmitting the callback URL message to the purchaser's mobile communication terminal if the payment server receives payment information including the purchaser's mobile communication terminal number and transaction purchase information, other than payment authentication information about the purchaser, from the merchant terminal; a payment information confirmation unit for confirming purchase details of the purchaser, including a payment amount, and payment information in cooperation with the purchaser's mobile communication terminal if the purchaser's mobile communication terminal accesses the payment server through the callback function of the callback URL message; an issuer server access URL acquisition unit for transmitting payment means information to the issuer information management intermediate server if the payment means information is received from either the merchant terminal or the purchaser's mobile communication terminal, thus acquiring URL information required to access the issuer server of the payment means; an issuer server access URL transmission unit for transmitting a redirection message, used to automatically redirect a connection of the purchaser's mobile communication terminal from the payment server to the issuer server, to the purchaser's mobile communication terminal having confirmed the payment information, using the issuer server access URL information acquired by the issuer server access URL acquisition unit, thus redirecting the connection of the purchaser's mobile communication terminal to the issuer server and allowing authentication to be performed by the issuer server; and an authentication result reply unit for transmitting authentication results together with the payment information received from the merchant terminal to the acquirer server and allowing payment approval to be performed by the acquirer server, if positive authentication results are received from the issuer server.

Further, the present invention provides an authentication and payment method performed by an authentication and payment system, the system including a payment server for intermediating between an issuer server that issues and operates payment means and an acquirer server that performs payment approval, the authentication and payment method performing direct sales transactions offline between a merchant and a purchaser and mail order sales transactions using multimedia or printed media, such as terrestrial broadcasting, satellite broadcasting or catalogs, using a purchaser's mobile communication terminal capable of receiving messages and performing wireless Internet connection.

The authentication and payment method comprises a callback URL message transmission step of generating a callback URL message (SMS or MMS message), including URL information required to access the payment server, and transmitting the callback URL message to the purchaser's mobile communication terminal, if payment information including a mobile communication terminal number and transaction purchase information, other than payment authentication information about the purchaser, is received from the merchant terminal and payment is requested; a purchase information confirmation and payment means information transmission step of confirming the purchase details of the purchaser, including a payment amount, and payment information in cooperation with the purchaser's mobile communication terminal connected to the payment server through a callback function of the callback URL message; an authentication request step of requesting the purchaser's mobile communication terminal to input payment authentication information about corresponding payment means if the payment information has been confirmed, and transmitting the payment authentication information and payment means information to a corresponding issuer server to request payment authentication from the issuer server if the payment authentication information is received from the purchaser's mobile communication terminal; and an authentication result return step of the payment server transmitting authentication results, received from the issuer server, and the payment information, received from the merchant terminal, to the acquirer server so as to allow the acquirer server to process payment approval for the payment means using the authentication results from the issuer server, if the issuer server compares the payment authentication information received from the purchaser's mobile communication terminal with previously registered payment authentication information to authenticate a corresponding transaction and transmits results indicating whether authentication succeeded to the payment server.

Further, the present invention provides an authentication and payment method performed by an authentication and payment system, the system including a payment server for intermediating between an issuer server that issues and operates payment means, an issuer information management intermediate server that manages URL information required to access domestic and foreign issuer servers and an acquirer server that performs payment approval, the authentication and payment method performing direct sales transactions offline between a merchant and a purchaser and mail order sales transactions using multimedia or printed media, such as terrestrial broadcasting, satellite broadcasting or catalogs, using a purchaser's mobile communication terminal capable of receiving messages and performing wireless Internet connection.

The authentication and payment method comprises a callback URL message transmission step of generating a callback URL message (SMS or MMS message), including URL information required to access the payment server, and transmitting the callback URL message to the purchaser's mobile communication terminal, if payment information including a mobile communication terminal number and transaction purchase information, other than payment authentication information about the purchaser, is received and payment is requested; a purchase information confirmation and payment means information transmission step of confirming purchase details of the purchaser, including a payment amount, and payment information in cooperation with the purchaser's mobile communication terminal connected to the payment server through a callback function of the callback URL message; a redirection request step of the payment server transmitting a redirection message, used to automatically redirect a connection of the purchaser's mobile communication terminal from the payment server to the issuer server, to the purchaser's mobile communication terminal using the issuer server access URL information, acquired by the issuer information management intermediate server, if the payment information has been confirmed; and an authentication result return step of the payment server transmitting authentication results, received from the issuer server, and the payment information, received from the merchant terminal, to the acquirer server so as to allow the acquirer server to process payment approval for the payment means using the authentication results from the issuer server, if the issuer server compares the payment authentication information received from the purchaser's mobile communication terminal with previously registered payment authentication information to authenticate a corresponding transaction and transmits results indicating whether authentication succeeded to the payment server.

In the present invention, a mobile communication terminal has functions, such as the reception of messages, for example, Short Message Service (SMS) messages or Multimedia Messaging Service (MMS) messages, and wireless Internet connection, as basic functions. Further, the mobile communication terminal has various wireless Internet connection functions, such as wireless Internet connection through terminal application software, for example, a virtual machine, wireless Internet connection using a specific abbreviated serial number, and wireless Internet connection using connection URL information in a two-dimensional barcode, which is a printed patterned image code, through a mobile communication terminal equipped with a camera. Further, the mobile communication terminal may have a slot in which a smart-card chip can be mounted, or a slot in which a plastic card, including a chip, can be inserted to make payment if necessary.

DESCRIPTION OF THE PREFERRED EMBODIMENTS

The above and other objects, features and other advantages of the present invention will be more clearly understood from the following detailed description taken in conjunction with the accompanying drawings.

Hereinafter, embodiments of the present invention will be described in detail with reference to the attached drawings.

Figure 1:
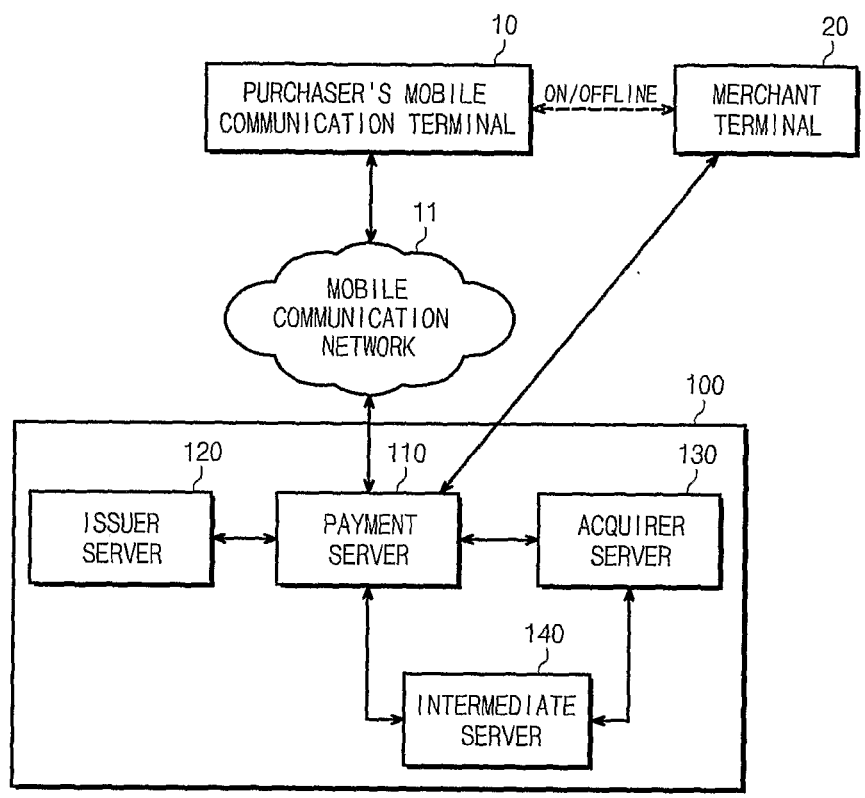
FIG. 1 is a block diagram showing the construction of an authentication and payment system according to an embodiment of the present invention.
Figure 2:
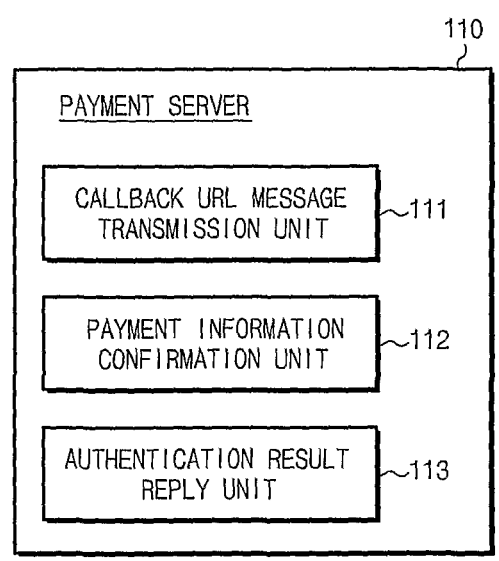
FIG. 2 is a block diagram showing the construction of a payment server of FIG. 1.

FIG. 1 is a block diagram showing the construction of an authentication and payment system according to an embodiment of the present invention and FIG. 2 is a block diagram showing the construction of a payment server of FIG. 1. FIGS. 1 and 2 illustrate an embodiment in which a purchaser's mobile communication terminal is authenticated via the payment server.

As shown in FIG. 1, an authentication and payment system 100 according to an embodiment of the present invention includes a payment server 110 that is connected to the mobile communication terminal 10 of a purchaser through a mobile communication network 11, is connected to the terminal 20 of a merchant through a mobile communication network, wired network or leased line network, and can be connected both to the purchaser's mobile communication terminal 10 and to the merchant terminal 20 through the wireless Internet, an issuer server 120 and an acquirer server 130 for performing authentication and approval through the medium of the payment server 110, and an intermediate server for intermediating between the payment server 110 and the acquirer server 130.

In the present invention, the purchaser's mobile communication terminal 10 and the merchant terminal 20 have functions, such as the reception of messages, for example, SMS or MMS messages, and wireless Internet connection, as basic functions. Further, the terminals 10 and 20 have various wireless Internet connection functions, such as wireless Internet connection through terminal application software, for example, a virtual machine, wireless Internet connection using a specific abbreviated serial number, and wireless Internet connection using connection URL information in a two-dimensional barcode, which is a printed patterned image code, through a mobile communication terminal equipped with a camera. Further, the terminals 10 and 20 may have a slot in which a smart-card chip can be mounted, or a slot in which a plastic card, including a chip, can be inserted in a payment process if necessary.

The merchant terminal may be installed in a vending machine and cooperate with the payment server. Further, the caller center or ARS system of home shopping companies or direct door-to-door sales service companies can intermediate a connection procedure between the merchant terminal and the payment server, or relay and transmit the purchaser's mobile communication terminal information, purchase details and payment information, received from the purchaser, to the payment server, instead of the merchant, during a process of achieving the object of the present invention.

Further, the payment server 110 is a server for allowing the connection of the merchant terminal 20, capable of establishing communication through the wired Internet or a leased line, in addition to the wireless Internet connection through the operation of terminal application software, such as a VM application on the merchant terminal. Further, the payment server 110 may allow a connection through a voice network in addition to a connection through a data communication network from the merchant terminal 20. Therefore, the payment server 110 may be an ARS system for processing authentication and payment requests from the merchant through the setup of a voice call with the merchant terminal 20 that is a wired or wireless telephone.

Further, the payment means of the present invention is a concept including various payment means, such as a credit card, electronic money, a membership card, micro payment using a mobile phone, or a direct debit from a bank account, and may further include other payment means.

Further, the concepts of the type of merchant terminal, a path and method of accessing the payment server and the payment means are equally applied to subsequent embodiments.

First, if the payment server 110 receives payment information including the mobile communication terminal number of the purchaser, purchase information (a purchase item and a payment amount) and/or payment means information (for example, a credit card number, electronic money identification information, a transfer account number, etc.), other than payment authentication information about the payment means of the purchaser, from the merchant terminal 20, the payment server 110 confirms whether the purchaser has subscribed to an authentication service through the issuer server using the payment information of the purchaser, generates a callback URL message (SMS or MMS message) to access the payment server 110, and transmits the callback Uniform Resource Locator (URL) message to the purchaser's mobile communication terminal 10.

Further, the payment server 110 confirms purchase details and the payment means information of the purchaser together with the purchaser's mobile communication terminal 10 while transmitting/receiving the purchase details and the payment means information, received from the merchant terminal 20, to/from the purchaser's mobile communication terminal 10 connected to the payment server 110 through the callback function of the callback URL message. Thereafter, the payment server 110 requests the purchaser's mobile communication terminal to input and transmit payment authentication information, such as a password of the payment means of the purchaser, Personal Identification Number (PIN) information or a chip authentication cryptogram, and transmits the payment authentication information and payment information received from the purchaser's mobile communication terminal 10 to the issuer server 120, thus requesting payment authentication from the issuer server 120.

In the above description, the payment server 110 can initially receive the payment means information of the purchaser from the merchant terminal 20 having requested payment, or receive the payment means information from the purchaser's mobile communication terminal 10 during the process of confirming the payment information together with the purchaser's mobile communication terminal 10 connected to the payment server 110.

Further, if the payment server 110 receives the payment means information from the purchaser's mobile communication terminal 10 or the merchant terminal 20, the payment server 110 transmits the received payment means information to the issuer server 120, requests the issuer server 120 to confirm whether a subscriber to a corresponding payment means, that is, the purchaser, has subscribed to an authentication service provided by the issuer server 120, and can perform subsequent steps if subscription to the authentication service is confirmed by the issuer server 120.

Further, the payment server 110 receives the results of authentication performed in cooperation with the mobile communication terminal 10 from the issuer server 120, and transmits the authentication results to the acquirer server 130, thus allowing payment approval to be performed by the acquirer server 130.

In this case, a request for payment approval can be performed by allowing the payment server 110 to transmit a payment approval request message containing the authentication results to the acquirer server 130. Further, a request for payment approval can be performed by allowing the payment server 110 to transmit authentication results to the acquirer server 130, the merchant terminal 20 and the purchaser's mobile communication terminal 10 and allowing the merchant terminal 20 to directly request payment approval from the acquirer server 130.

The issuer server 120 issues, manages and operates a payment means, compares the payment authentication information and payment information received from the payment server 110, with the purchaser's payment authentication information about payment means, which was stored at the time of issuing the payment means or stored by the purchaser during a previous registration process, and verifies the compared information, thus authenticating a corresponding transaction.

In the meantime, the purchaser's mobile communication terminal 10 encrypts payment authentication information, such as a password, PIN, or chip authentication cryptogram, and transmits the encrypted payment authentication information to the payment server 110. The payment server 110 transmits the encrypted payment authentication information to the issuer server 120. Preferably, the issuer server 120 receives and decrypts the encrypted payment authentication information, acquires payment authentication information, and performs authentication through the comparison and verification of payment authentication information.

In the present invention, for an authentication scheme, various authentication schemes including a password-based scheme, a chip scheme, a digital signature scheme using a certificate, a biometric recognition scheme, or a token authentication scheme using a random number generator and a personal encryption table card, may be utilized. The payment authentication information according to the authentication scheme may be personally inputted by the purchaser, may be stored in the form of an electronic wallet implemented in a mobile communication terminal using software, or may be stored in a smart card in a mobile communication terminal having a slot in which a smart card chip and a smart card can be mounted and inserted. The stored payment authentication information must be interpreted as a comprehensive concept that includes personal payment authentication information that must be transmitted to a server through a process of inputting and confirming the password of the electronic wallet or the password of the smart card.

Further, in order to provide the service of the present invention only to subscribers to the authentication service, the issuer server 120 can confirm whether the purchaser has subscribed to the authentication service corresponding to a payment means and transmit the results of confirmation to the payment server 110 if payment means information has been received from the payment server 110. In this case, the issuer server 120 must manage information indicating whether subscribers using payment means managed by the issuer server 120 subscribe to the authentication service.

The acquirer server 130 receives authentication results obtained by the issuer server 120 from the payment server 110, and functions to perform payment approval for a corresponding payment means, acquire payment transactions and perform settlement for member stores. As described above, the acquirer server 130 may receive a payment approval request message containing positive authentication results from the payment server 110, or receive authentication results from the payment server 110 and receive a separate approval request from the merchant terminal 20, thus processing approval.

In the meantime, FIG. 1 shows an embodiment in which the payment server 110 is directly connected to the acquirer server 130, but the intermediate server 140 for intermediating a payment approval and acquisition process can be alternatively disposed between the payment server 110 and the acquirer server 130.

With reference to FIG. 2, respective components of the payment server 110, described with reference to FIG. 1, are described in detail.

As shown in FIG. 2, the payment server 110 includes a callback URL message transmission unit 111, a payment information confirmation unit 112 and an authentication result reply unit 113.

When receiving the mobile communication terminal number of the purchaser from the merchant terminal 20, the callback URL message transmission unit 111 generates a callback URL message (SMS or MMS message) including URL information to allow the purchaser's mobile communication terminal 10 to access the payment server 110 and transmits the callback URL message to the purchaser's mobile communication terminal 10.

In this case, the callback URL message transmission unit 111 generates the callback URL message using an identifier or key value used to index purchase information received from the merchant terminal 20. Accordingly, when the purchaser's mobile communication terminal 10 receives the callback URL message and accesses the payment server, the callback URL message transmission unit 111 preferably allows the purchaser's mobile communication terminal 10 to access the payment server 110 so that the payment server 110 can recognize and manage the connection and continuation of transaction information between the purchaser and the merchant through the use of information included in a URL, such as purchase information, indexes, identifiers, etc.

If the purchaser's mobile communication terminal 10 accesses the payment server 110 through the use of the callback function of the callback URL message, the payment information confirmation unit 112 confirms purchase information by transmitting and receiving payment related purchase information to and from the purchaser's mobile communication terminal 10, requests the purchaser's mobile communication terminal 10 to input payment means information, and receives the payment means information.

The process of confirming the payment information includes the confirmation of the purchase information, and the acquisition and confirmation of the payment means information. In the embodiment of the present invention, the payment server 110 can acquire the payment means information from the merchant terminal 20, or from the purchaser's mobile communication terminal 10 at the time of processing the confirmation of payment information.

In the former case, the payment server 110 receives payment information including a mobile communication terminal number and transaction purchase information, other than payment authentication information about the purchaser, from the merchant terminal 20 when a payment request is received from the merchant terminal 20. The payment information confirmation unit 112 transmits the payment means information received from the merchant terminal 20 to the purchaser's mobile communication terminal 10 connected to the payment server 110, and receives a confirmation response, thus confirming the payment information.

In the latter case, the payment information confirmation unit 112 requests the purchaser's mobile communication terminal 10 connected to the payment server 110 to input payment means information and receives the payment means information from the purchaser's mobile communication terminal 10, thus confirming payment information.

Further, the payment information confirmation unit 112 transmits the payment means information received from the merchant terminal 20 or the purchaser's mobile communication terminal 10 to the issuer server 120, and requests the issuer server 120 to confirm whether the purchaser has subscribed to the authentication service. Only when a response to authentication service subscription confirmation has been received from the issuer server 120, the payment information confirmation unit 112 can confirm corresponding payment information, or allow authentication request and processing to be executed through the authentication result reply unit 113.

If the confirmation of payment information has been completed, the authentication result reply unit 113 requests the purchaser's mobile communication terminal 10 to input and transmit payment authentication information about a corresponding payment means. If the payment authentication information is received, the authentication result reply unit 113 transmits the payment authentication information and payment information to the issuer server 120, thus requesting payment authentication. If positive authentication results are received from the issuer server 120, the authentication result reply unit 113 transmits the authentication results to the acquirer server 130.

The operation of the authentication result reply unit 113 requesting authentication and receiving authentication information from the purchaser's mobile communication terminal 10 is performed using end-to-end wireless encryption channel and encryption application software on the terminal. The encryption is initiated by the payment server 110. The requested payment authentication information may be inputted payment authentication information such as a password or PIN, or may be payment authentication information including a chip authentication cryptogram generated in a smart card or an electronic signature cryptogram generated by an electronic signature. After the payment authentication information has been encrypted in the terminal, the encrypted information is decrypted by the payment server 110, so that the payment authentication information is extracted and used.

In the meantime, an approval request can be performed by the payment server 110 or the merchant terminal 20 in the present invention.

Therefore, in the former case, the authentication result reply unit 113 transmits a payment approval request message containing positive authentication results to the acquirer server 130. If approval results are received from the acquirer server 130, the authentication result reply unit 113 transmits the approval results both to the merchant terminal 20 and to the purchaser's mobile communication terminal 10, thus completing payment.

In the latter case, the authentication result reply unit 113 transmits an authentication result message to the acquirer server 130, the merchant terminal 20 and the purchaser's mobile communication terminal 10 so that payment approval can be directly processed between the merchant terminal 20 and the acquirer server 130.

In this case, if positive authentication results are received from the payment server 110 and a separate payment approval request message is received from the merchant terminal 20 with respect to the received authentication results, the acquirer server 130 processes corresponding payment approval and transmits approval results both to the merchant terminal 20 and to the purchaser's mobile communication terminal 10.

Figure 3:
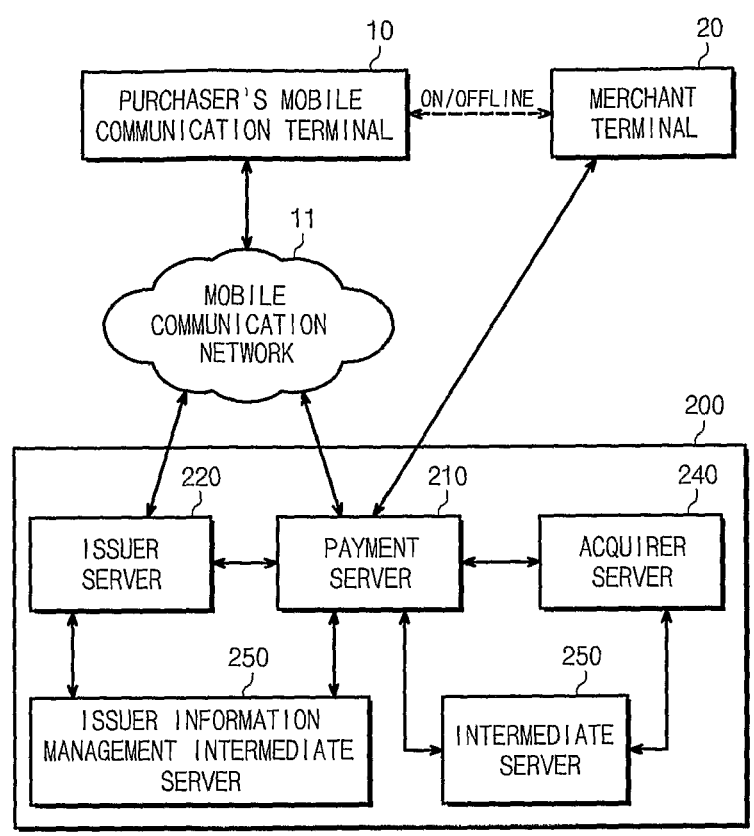
FIG. 3 is a block diagram showing the construction of an authentication and payment system according to another embodiment of the present invention.
Figure 4:
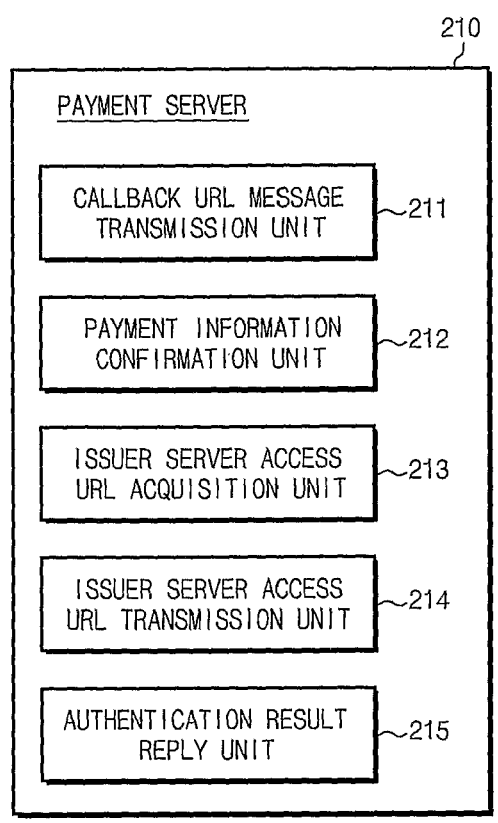
FIG. 4 is block diagram showing the construction of a payment server of FIG. 3.

FIG. 3 is a block diagram showing the construction of an authentication and payment system according to another embodiment of the present invention and FIG. 4 is a block diagram showing the construction of the payment server of FIG. 3. FIGS. 3 and 4 illustrate an embodiment in which a purchaser's mobile communication terminal directly transmits payment authentication information about a transaction to an issuer server without passing through a payment server, authenticates the transaction, and acquires URL information required to access the issuer server through an issuer information management intermediate server.

As shown in FIGS. 3 and 4, an authentication and payment system 200 according to another embodiment of the present invention includes a payment server 210 that is connected to a purchaser's mobile communication terminal 10 through a mobile communication network 11 and can be connected to a merchant terminal 20 through a mobile communication network wired network or leased line network, an issuer server 220 for performing authentication and approval through the payment server 210, an issuer information management intermediate server 230, and an acquirer server 240.

Unlike the embodiment of FIG. 1, the issuer server 220 is directly connected to the purchaser's mobile communication terminal 10 through the mobile communication network 11.

If the payment server 210 receives payment information including the mobile communication terminal number of the purchaser, purchase information (for example, a purchase item and a payment amount) and/or payment means information (for example, a credit card number, electronic money identification information, etc.) from the merchant terminal 20, the payment server 210 generates a callback URL message (SMS or MMS message) to connect to the payment server 210 and transmits the callback URL message to the purchaser's mobile communication terminal 10.

Further, the payment server 210 transmits payment means information, received from the merchant terminal 20, to the purchaser's mobile communication terminal 10 connected to the payment server 210 through the callback function of the callback URL message, thus confirming the payment means information. Thereafter, the payment server 210 automatically redirects the connection of the purchaser's mobile communication terminal 10 from the payment server 210 to the issuer server 220 using URL information required to access the server of the issuer of the corresponding payment means. Accordingly, the purchaser is authenticated by the issuer server 220 through the use of the mobile communication terminal 10.

In the above procedure, if the payment means information about the purchaser is received, the payment server 210 transmits the received payment means information to the issuer information management intermediate server 230 so as to confirm whether URL information required to access the issuer server of the corresponding payment means is acquired and whether the purchaser has subscribed to an authentication service, so that the confirmation of the acquisition of the URL information and the subscription to the authentication service must be requested. The payment means information may be initially received from the merchant terminal 20 having requested payment or from the purchaser's mobile communication terminal 10 connected to the payment server 210 in a process of confirming payment information together with the purchaser's mobile communication terminal 10.

Further, the payment server 210 receives the results of authentication performed together with the mobile communication terminal 10 from the issuer server 220, and transmits the authentication results to the acquirer server 240, thus allowing payment approval to be performed by the acquirer server 240.

In this case, a payment approval request can be performed by allowing the payment server 210 to transmit a payment approval request message containing the authentication results to the acquirer server 240. Further, the payment approval request can be performed by allowing the payment server 210 to transmit the authentication results both to the acquirer server 240 and to the merchant terminal 20 and allowing the merchant terminal 20 to directly request the approval from the acquirer server 240.

The issuer server 220 issues, manages and operates a payment means. If the purchaser's mobile communication terminal 10 accesses the issuer server 220, the issuer server 220 requests the purchaser's mobile communication terminal 10 to input and transmit payment authentication information about the payment means of the purchaser, and authenticates a corresponding transaction using the payment authentication information received from the purchaser's mobile communication terminal 10.

In this case, the operation of the issuer server 220 requesting authentication and receiving authentication information from the purchaser's mobile communication terminal 10 is performed using end-to-end wireless encryption channel and encryption application software on the terminal. The initiation of encryption is performed by the issuer server. The requested payment authentication information may be inputted payment authentication information such as a password or PIN, or may be payment authentication information including a chip authentication cryptogram generated in a smart card or an electronic signature cryptogram generated by an electronic signature. The payment authentication information is encrypted and transmitted by the terminal. The issuer server 220 receives and decrypts the encrypted payment authentication information to acquire the payment authentication information, and then performs authentication.

For an authentication scheme in the present invention, various authentication schemes including a password-based scheme, a chip scheme, a certification scheme, a biometric recognition scheme, etc. may be utilized. The payment authentication information must be interpreted as a comprehensive concept that includes personal payment authentication information that must be inputted or transmitted by the purchaser with respect to various authentication schemes.

The issuer information management intermediate server 230 manages URL information required to access a plurality of domestic and foreign issuer servers so as to allow the purchaser's mobile communication terminal 10 to access the issuer server 220 through the wireless Internet. If the payment means information is received from the payment server 210, the issuer information management intermediate server 230 transmits URL information required to access the issuer of a corresponding payment means to the payment server 210.

In this case, the issuer information management intermediate server 230 transmits the payment means information received from the payment server 210 to the corresponding issuer server 220, thus requesting the issuer server 220 to confirm whether a subscriber to the payment means, that is, the purchaser, has subscribed to an authentication service provided by the issuer server 220. If subscription has been confirmed by the issuer server 220, the issuer information management intermediate server 230 transmits both the issuer access URL information and authentication service subscription confirmation information to the payment server 210.

In this case, the issuer server 220 manages information indicating whether subscribers to payment means managed by the issuer server 220 subscribe to the authentication service. If the payment means information is received from the issuer information management intermediate server 230, the issuer server 220 confirms whether a subscriber to a corresponding payment means, that is, a purchaser, has subscribed to the authentication service, and transmits authentication results to the issuer information management intermediate server 230.

The acquirer server 240 receives the results of authentication performed by the issuer server 220 from the payment server 210, performs payment approval for the corresponding payment means, and performs acquisition and settlement for member stores. As described above, the acquirer server 240 may process payment approval by receiving a payment approval request message containing positive authentication results from the payment server 210 or receiving a separate approval request from the merchant terminal 20.

In the meantime, FIG. 3 shows an embodiment in which the payment server 210 is directly connected to the acquirer server 240. However, the intermediate server 250 for intermediating a payment approval and acquisition procedure may be alternatively disposed between the payment server 210 and the acquirer server 240.

Respective components of the payment server 210, described with reference to FIG. 3, are described in detail with reference to FIG. 4.

As shown in FIG. 4, the payment server 210 includes a callback URL message transmission unit 211, a payment information confirmation unit 212, an issuer server access URL acquisition unit 213, an issuer server access URL transmission unit 214, and an authentication result reply unit 215.

When receiving the mobile communication terminal number of the purchaser from the merchant terminal 20 that enables the connection through a mobile communication network, wired network or leased line network the callback URL message transmission unit 211 generates a callback URL message (SMS or MMS message) that includes URL information allowing the purchaser's mobile communication terminal 10 to access the payment server 210, and transmits the callback URL message to the purchaser's mobile communication terminal 10.

In this case, the callback URL message transmission unit 211 generates the callback URL message using an identifier or key value used to index purchase information received from the merchant terminal 20. Accordingly, when the purchaser's mobile communication terminal 10 receives the callback URL message and accesses the payment server, the callback URL message transmission unit 211 preferably allows the purchaser's mobile communication terminal 10 to access the payment server 210 so that the payment server 210 can recognize and manage the connection and continuation of transaction information between the purchaser and the merchant, through the use of purchase information, indexes, identifiers, etc. included in a URL.

If the purchaser's mobile communication terminal 10 accesses the payment server 210 through the callback function of the callback URL message, the payment information confirmation unit 212 confirms purchase information by transmitting and receiving payment related purchase information to and from the purchaser's mobile communication terminal 10.

The process of confirming the payment information includes the confirmation of the purchase information and the acquisition and confirmation of the payment means information. In the embodiment of the present invention, the payment server 210 can acquire the payment means information from the merchant terminal 20, or from the purchaser's mobile communication terminal 10 at the time of processing the confirmation of payment information.

In the former case, the payment server 210 receives payment information including a mobile communication terminal number and transaction purchase information, other than payment authentication information about the purchaser, from the merchant terminal 20 when a payment request is received from the merchant terminal 20. In this case, the payment information confirmation unit 212 transmits the payment means information, received from the merchant terminal 20, to the purchaser's mobile communication terminal 10 connected to the payment server 210, and receives a confirmation response, thus confirming the payment information.

In the latter case, the payment information conformation unit 212 requests the purchaser's mobile communication terminal 10 connected to the payment server 210 to input payment means information, and receives the payment means information from the purchaser's mobile communication terminal 10, thus confirming payment information.

Further, if payment means information is received from either the merchant terminal 20 or the purchaser's mobile communication terminal 10, the issuer server access URL acquisition unit 213 transmits the received payment means information to the issuer information management intermediate server 230, requests and acquires URL information required to access the issuer server of the corresponding payment means from the issuer information management intermediate server 230, and also requests and acquires confirmation results indicating whether the purchaser has subscribed to an authentication service corresponding to the payment means from the intermediate server 230.

The issuer server access URL transmission unit 214 transmits a redirection message, used to automatically redirect the connection of the purchaser's mobile communication terminal 10 from the payment server 210 to the issuer server 220, to the purchaser's mobile communication terminal 10 having confirmed payment information through the use of the acquired issuer server access URL information, thus allowing the Internet connection of the purchaser's mobile communication terminal 10 to be automatically redirected to the payment server 220.

In this case, the redirection message denotes a message that cannot be visually confirmed by the purchaser, but allows the mobile communication terminal 10 to automatically connect to a redirection address without the purchaser's confirmation when the redirection message is received through the mobile communication terminal 10.

If positive authentication results are received from the issuer server 220, the authentication result reply unit 215 transmits the authentication results to the acquirer server 240.

In the meantime, the approval request of the present invention can be performed by the payment server 210 or the merchant terminal 20. At this time, the merchant terminal 20 can make an approval request through a member store system, a wired network intermediate system, etc. The principal body making an approval request is the merchant terminal 20 regardless of the system through which the process passes for the approval request, so that the merchant terminal 20 can be integrated to make an approval request, which is applied to the subsequent embodiments.

In the former case, the authentication result reply unit 215 transmits a payment approval request message containing the authentication results to the acquirer server 240. If approval results are received from the acquirer server 240, the authentication result reply unit 215 transmits the approval results both to the merchant terminal 20 and to the purchaser's mobile communication terminal 10, thus completing payment.

In the latter case, the authentication result reply unit 215 transmits an authentication result message to the acquirer server 240, the merchant terminal 20 and the purchaser's mobile communication terminal 10 so that approval is directly processed between the merchant terminal 20 and the acquirer server 240. At this time, if positive authentication results are received from the payment server 210, and a separate payment approval request message is received from the merchant terminal 20, via a member store system or a wired network intermediate system with respect to the case corresponding to the received authentication results, the acquirer server 240 processes corresponding payment approval, transmits payment approval results to the merchant terminal 20 through the member store system or the wired network intermediate system, or directly transmits the payment approval results to the merchant terminal 20. Preferably, the payment approval results are also transmitted to the purchaser's mobile communication terminal 10.

Next, an authentication and payment process executed by the system of the present invention, described with reference to FIGS. 1 and 2, is described in detail with reference to FIG. 5.

Figure 5:
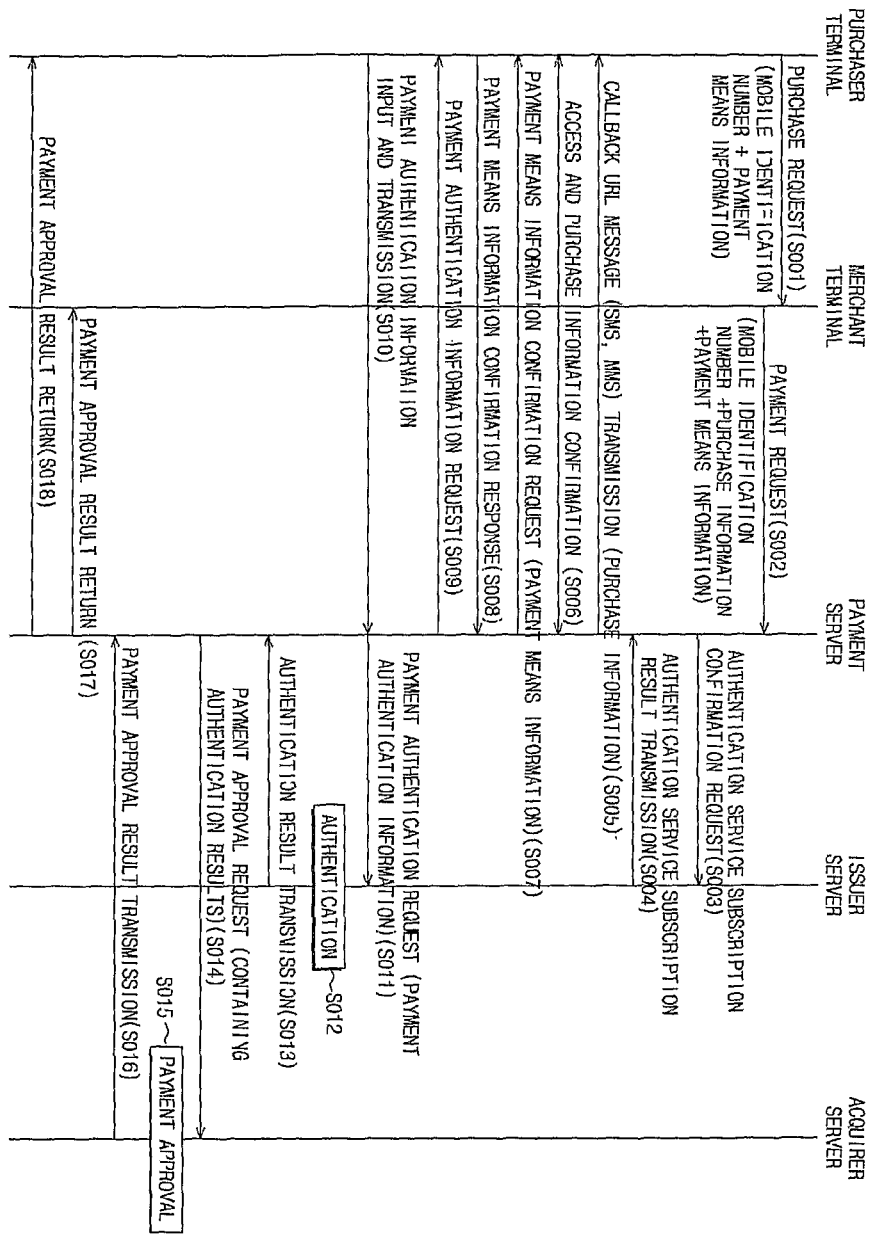
FIG. 5 is a flowchart of an authentication and payment method according to an embodiment of the present invention.

FIG. 5 is a flowchart of an authentication and payment method according to an embodiment of the present invention.

As shown in FIG. 5, when the decision to purchase a commodity is made between a purchaser and a merchant in a direct sales transaction offline or in a mail order sales transaction using multimedia or printed media, such as terrestrial broadcasting, satellite broadcasting or catalogs, the purchaser informs the merchant of his or her mobile communication terminal number information and payment means information at step S001. The merchant accesses the payment server 110 through the merchant terminal 20 and transmits payment information including the mobile communication terminal number and transaction purchase information, other than payment authentication information about the purchaser, to the payment server 110 at step S002.

In this case, step S001 can be performed by the purchaser personally inputting the mobile communication terminal number information and payment means information to the merchant terminal 20, such as a vending machine or an ARS system. In this case, if the information has been completely inputted by the purchaser, the merchant terminal 20 will spontaneously access the payment server 110 and transmit the inputted information to the payment server 110 at step S002.

The payment server 110 transmits the payment means information to the issuer server 120, and confirms whether the purchaser has subscribed to an authentication service at step S003. If a response to the authentication service subscription confirmation is received from the issuer server 120 at step S004, the payment server 110 generates a callback URL message (SMS or MMS message) including URL information required to access the payment server, and transmits the callback URL message to the purchaser's mobile communication terminal 10 at step S005.

In this case, the callback URL message may be configured to include purchase information. Steps S003 and S004 of confirming whether the purchaser has subscribed to the authentication service and of receiving the response to the confirmation can be omitted.

The purchaser confirms the callback URL message received through the mobile communication terminal 10, and allows the mobile communication terminal 10 to access the payment server 110 through the callback function of the message when the purchaser has the intention to pay at step S006.

The payment server 110 transmits a wireless Web page including the payment means information received from the merchant terminal 20 at step S002 to the purchaser's mobile communication terminal 10 and requests the purchaser's mobile communication terminal 10 to confirm the payment means information at step S007. If the response to the payment means information confirmation is received from the purchaser's mobile communication terminal 10 at step S008, the payment server 110 requests the purchaser's mobile communication terminal 10 to input payment authentication information (personal payment authentication information) about a corresponding payment means at step S009.

If purchase information is not included in the callback URL message transmitted by the payment server 110 at step S005, purchase information can be transmitted together with the confirmation request when the conformation of the payment means information is requested at step S007, or purchase information can be confirmed before the confirmation of the payment means information is requested.

If payment authentication information is received from the purchaser's mobile communication terminal 10, the payment server 110 transmits the received payment authentication information to the issuer server 120, thus requesting payment authentication from the issuer server 120 at step S011. The issuer server 120 compares the received payment authentication information with payment authentication information that was previously registered and stored at the time of issuing the payment means to process authentication at step S012, and transmits authentication results to the payment server 110 at step S013.

Next, the payment server 110 transmits a payment approval request message containing the authentication results, received from the issuer server 120, to the acquirer server 130 at step S014. The acquirer server 130 processes payment approval for the corresponding payment means at step S015, and transmits the approval results to the payment server 110 at step S016.

The payment server 110 returns the approval results received from the acquirer server 130 both to the merchant terminal 20 and to the purchaser's mobile communication terminal 10 at steps S017 and S018. The return of the approval results can be implemented in the form of a message, such as an SMS or MMS message, or in the form of a wireless Web page.

The payment server 110 can transmit only authentication results to the acquirer server 130 at step S013. In this case, the acquirer server 130 approves according to a separate approval request received from the merchant terminal 20 or through a member store system or a wired network intermediate system (not shown).

In the meantime, FIG. 5 illustrates the case in which the payment server 110 receives payment means information from the merchant terminal 20. However, at step S002, the payment server 110 may receive a mobile communication terminal number, payment authentication information about the purchaser and transaction purchase information, other than payment means information, and may later request payment means information from the purchaser's mobile communication terminal 10 connected to the payment server 110 and directly receive the payment means information from the purchaser.

In this case, in the embodiment, steps S007 and S008 may be replaced by the steps of requesting the input of payment means information and receiving the payment means information. Steps S003 and S004 must be performed before step S009 of requesting the input of payment authentication information after the payment means information has been received.

Next, the authentication and payment process executed by the system of the present invention, described with reference to FIGS. 3 and 4, is described in detail by classifying embodiments according to a principal body of transmitting payment means information, with reference to FIGS. 6 and 7.

Figure 6:
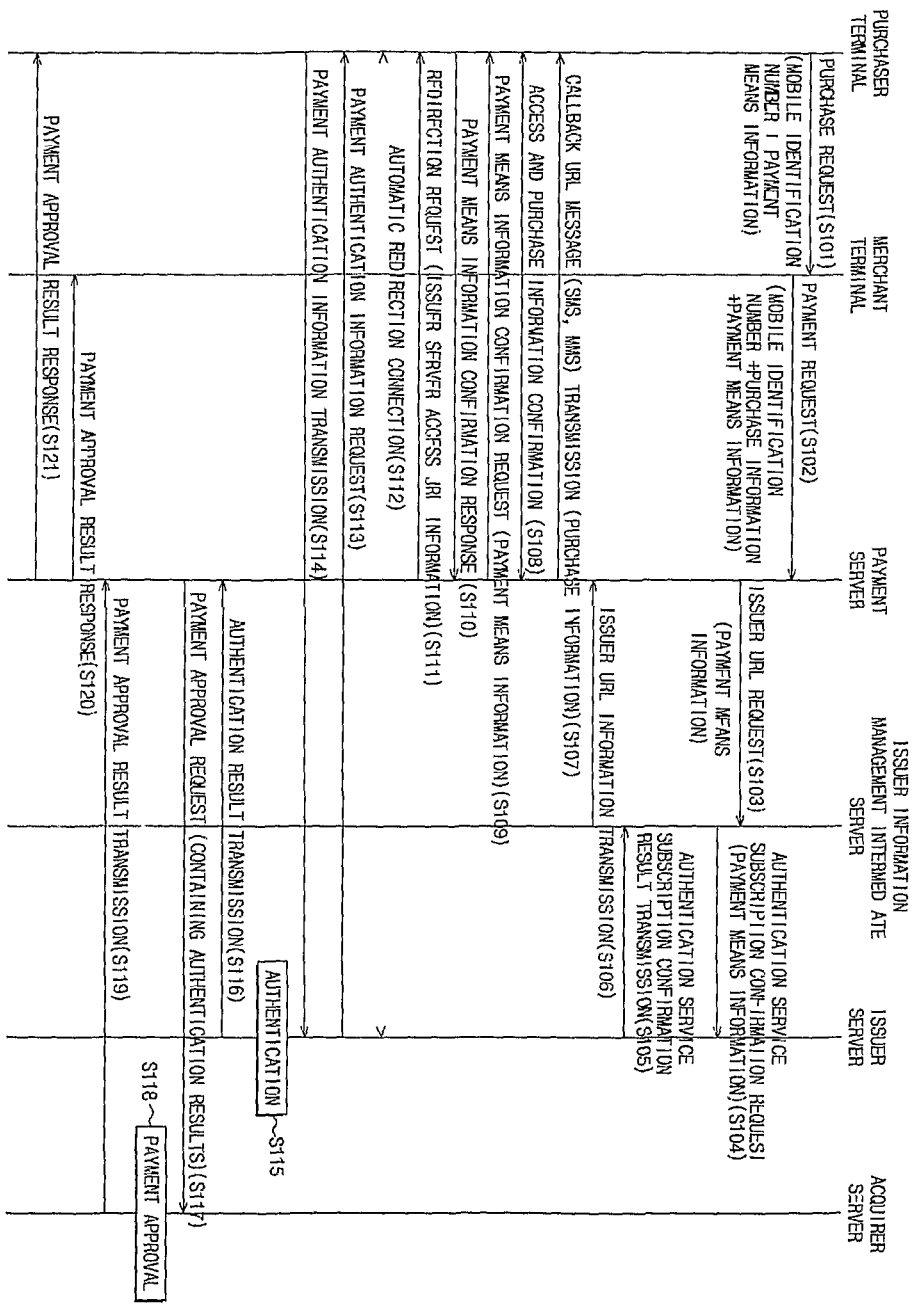
FIG. 6 is a flowchart of an authentication and payment method according to another embodiment of the present invention.

FIG. 6 is a flowchart of an authentication and payment method according to another embodiment of the present invention, which shows an embodiment in which the payment server 210 receives payment means information from the merchant terminal 20.

As shown in FIG. 6, when the decision to purchase a commodity is made between a purchaser and a merchant in a direct sales transaction offline or in a mail order sales transaction using multimedia or printed media, such as terrestrial broadcasting, satellite broadcasting or catalogs, the purchaser informs the merchant of his or her mobile communication terminal number information and payment means information at step S101. The merchant accesses the payment server 210 through the merchant terminal 20 and transmits payment information including the purchaser's mobile communication terminal number and transaction purchase information, other than payment authentication information about the purchaser, to the payment server 210 at step S102.

In this case, step S101 can be performed by the purchaser personally inputting the mobile communication terminal number information and payment means information to the merchant terminal 20, such as a vending machine or an ARS system. In this case, if the information has been completely inputted by the purchaser, the merchant terminal 20 will spontaneously access the payment server 210 and transmit the inputted information to the payment server 210 at step S102. Further, the merchant can transmit the inputted information to the payment server 210 through a member store system such as a call center.

The payment server 210 transmits the payment means information to the issuer information management intermediate server 230, and requests URL information required to access the issuer server from the issuer information management intermediate server 230 at step S103. The issuer information management intermediate server 230 transmits the payment means information to the issuer server 220, and confirms whether the purchaser has subscribed to an authentication service at step S104. If a response to the authentication service subscription conformation is received from the issuer server 220 at step S105, the issuer information management intermediate server 230 transmits URL information required to access a corresponding issuer to the payment server 210 at step S106. In this case, steps S104 and S105 of confirming whether the purchaser has subscribed to the authentication service and receiving the response to the confirmation can be omitted.

Next, the payment server 210 generates a callback URL message including URL information required to access the payment server, and transmits the callback URL message to the purchaser's mobile communication terminal 10 at step S107. In this case, the callback URL message may be configured to include purchase information.

The purchaser confirms the callback URL message received through the mobile communication terminal 10, and allows the mobile communication terminal 10 to access the payment server 210 using the callback function of the message when the purchaser has the intention to pay at step S108.

The payment server 210 transmits a wireless Web page including the payment means information received from the merchant terminal 20 at step S102 to the purchaser's mobile communication terminal 10, thus requesting the purchaser's mobile communication terminal 10 to confirm the payment means information at step S109. If the response to the payment means information confirmation is received from the purchaser's mobile communication terminal 10 at step S110, the payment server 210 transmits a redirection message, used to automatically redirect the connection of the purchaser's mobile communication terminal from the payment server to the issuer server, to the purchaser's mobile communication terminal 10 using the issuer server access URL information, obtained at steps S103 to S106, at step S111.

At this time, if purchase information is not included in the callback URL message transmitted by the payment server 210 at step S107, purchase information can be transmitted together with the confirmation request when the confirmation of the payment means information is requested at step S109, or purchase information can be confirmed before the confirmation of the payment means information is requested.

If the redirection message is received from the payment server 210 at step S111 as the confirmation of the payment means information by the purchaser is completed at step S110, the connection of the purchaser's mobile communication terminal 10 to the payment server 210 is automatically redirected to the issuer server 220 at step S112.

The issuer server 220 requests the purchaser's mobile communication terminal 10 connected thereto to input payment authentication information (personal payment authentication information) about a corresponding payment means at step S113. If the payment authentication information is received from the purchaser's mobile communication terminal 10 at step S114, the issuer server 220 compares the received payment authentication information with payment authentication information that was previously registered and stored at the time of issuing the corresponding payment means to process authentication at step S115, and transmits authentication results to the payment server 210 at step S116.

Next, the payment server 210 transmits a payment approval request message containing the authentication results, received from the issuer server 220, to the acquirer server 230 at step S117. The acquirer server 230 processes payment approval for the corresponding payment means at step S118, and transmits approval results to the payment server 210 at step S119.

The payment server 210 returns the approval results from the acquirer server 230 to the merchant terminal 20 and the purchaser's mobile communication terminal 10 at steps S120 and S121. The return of the approval results can be implemented in the form of a message such as an SMS or MMS message, or in the form of a wireless Web page.

In the meantime, the payment server 210 can transmit only authentication results to the acquirer server 230 at step S117. In this case, the acquirer server 230 approves according to a separate approval request received from the merchant terminal 20 or through a member store system or a wired network intermediate system (not shown).

Figure 7:
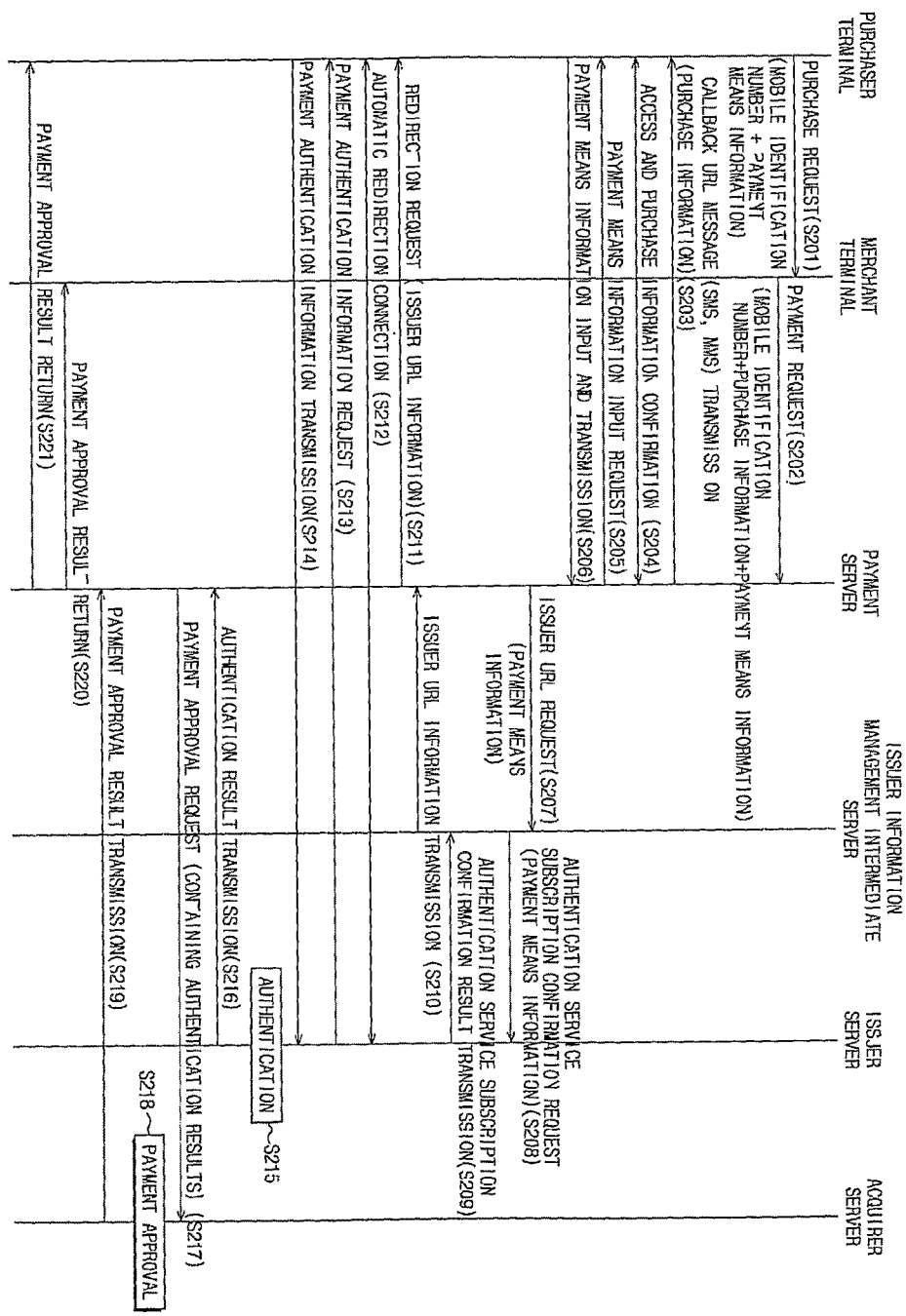
FIG. 7 is a flowchart of an authentication and payment method according to a further embodiment of the present invention.

FIG. 7 is a flowchart of an authentication and payment method according to a further embodiment of the present invention, in which the payment server 210 receives payment means information from the purchaser's mobile communication terminal 10.

As shown in FIG. 7, when the decision to purchase a commodity is made between a purchaser and a merchant in a direct sales transaction offline or in a mail order sales transaction using multimedia or printed media, such as terrestrial broadcasting, satellite broadcasting or catalogs, the purchaser informs the merchant of his or her mobile communication terminal number at step S201. The merchant accesses the payment server 210 through the merchant terminal 20, transmits payment information including the purchaser's mobile communication terminal number and transaction purchase information, other than payment authentication information about the purchaser, to the payment server 210, and requests payment from the payment server 210 at step S202.

The payment server 210 generates a callback URL message (SMS or MMS message) including URL information required to access the payment server, and transmits the callback URL message to the purchaser's mobile communication terminal 10 at step S203. The purchaser confirms the callback URL message received through the mobile communication terminal 10, and allows the mobile communication terminal 10 to access the payment server 210 through the callback function of the message when the purchaser has the intention to pay at step S204.

If the purchaser's mobile communication terminal 10 accesses the payment server 210, the payment server 210 requests the purchaser's mobile communication terminal 10 to input payment means information at step S205. If the payment means information is received from the purchaser's mobile communication terminal 10 at step S206, the payment server 210 transmits corresponding payment means information to the issuer information management intermediate server 230, and requests URL information required to access the issuer server from the issuer information management intermediate server 230 at step S207.

The issuer information management intermediate server 230 transmits the payment means information to the issuer server 220, and confirms whether the purchaser has subscribed to an authentication service at step S208. If a response to the authentication service subscription confirmation is received from the issuer server 220 at step S209, the issuer information management intermediate server 230 transmits URL information required to access a corresponding issuer to the payment server 210 at step S210. In this case, steps S208 and S209 of confirming whether the purchaser has subscribed to the authentication service and receiving the confirmation response can be omitted.

Next, subsequent steps S211 to S221 of the payment server 210 transmitting a redirection message, used to automatically redirect the connection of the purchaser's mobile communication terminal from the payment server to the issuer server, to the purchaser's mobile communication terminal 10 using the acquired issuer server access URL information, and of performing authentication and approval are the same as those of the embodiment of FIG. 6, so that a detailed description is omitted.

As described above, the present invention provides an authentication and approval system and method using a mobile communication terminal, which performs authentication and payment without leaking the payment information of a purchaser using the terminal of a merchant and the mobile communication terminal of the purchaser and separately processes authentication and approval in direct sales transactions between the merchant and the purchaser offline and mail order sales transactions using multimedia or printed media, such as terrestrial broadcasting, satellite broadcasting or catalogs. Therefore, the present invention is advantageous in that it provides a new payment interface for extending authentication and payment services performed on/offline to direct sales fields such as door-to-door sales, thus solving the problem of hand-written transactions, which is considered to be a cause of forgery and illegal use of payment information. Further, the present invention is advantageous in that it provides a new payment and authentication scheme using a mobile communication terminal in direct sales transactions on/offline, thus activating direct sales transactions based on the stability and reliability of transactions.

Further, the present invention is advantageous in that it can perform transactions through a safe and convenient payment process in an offline member store having a disadvantage in that it is impossible to install a payment terminal or the installation of the terminal is expected to be economically inefficient due to local and transactional characteristics, or a small-scale member store such as a vending machine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. The scope of the present invention is defined by the following claims rather than the detailed description. Accordingly, it is apparent that all changes or modified embodiments derived from the meaning and scope of the claims and their equivalent concepts belong to the scope of the present invention.

What is claimed is:

1. A method for providing a payment service comprising:
instructing a purchaser's mobile communication terminal to generate a callback URL message responsive to receiving a mobile communication terminal number of a purchaser from a merchant terminal, the callback URL message including URL information and an identifier or key value for indexing purchase information to allow the purchaser's mobile communication terminal to access a payment server;
transmitting a confirmation response to the purchaser's mobile communication terminal confirming purchase details received by the payment server;
receiving payment authentication information for payment means of the purchaser from the purchaser's mobile communication terminal;
after receiving payment authentication information, automatically redirecting a connection of the purchaser's mobile communication terminal from the payment server to an issuer server for transmitting payment means information to the issuer server to enable the purchaser's mobile communication terminal to employ issuer server access URL transmission for requesting the issuer server to authenticate payment means of the purchaser, wherein the issuer server compares the payment authentication information received from the purchaser's mobile communication terminal with previously registered payment authentication information to authenticate a corresponding transaction and transmit authentication results indicative of success to the payment server;
responsive to receiving the authentication results from the issuer server and payment information from the merchant terminal, automatically redirecting a connection of the purchaser's mobile communication terminal from the payment server to an acquirer server to approve payment by the acquirer server; and
causing the acquirer server to process approval according to an approval request received from the merchant terminal, a member store system or a wired network intermediate system, and transmit approval results to the merchant terminal and the purchaser's mobile communication terminal.

2. The method of claim 1, further comprising requesting the issuer server to confirm whether the purchaser has subscribed to an authentication service corresponding to the payment means.

3. The method of claim 2, further comprising using the issuer server to confirm whether the purchaser has subscribed to the authentication service corresponding to the payment means after the purchase information confirmation is received and payment means information transmission step has been performed.

4. The method of claim 1, further comprising:
transmitting, from the payment server, a payment approval request message including authentication results from the issuer server;
transmitting payment information received from the merchant terminal to the acquirer server; and
transmitting approval results to the merchant terminal and to the purchaser's mobile communication terminal responsive to receiving the approval results relative to authentication of the purchaser.

5. The method of claim 1, further comprising:
transmitting the payment means information from the payment server to the issuer server of the corresponding payment means;
confirming whether the purchaser has subscribed to an authentication service corresponding to the payment means of the purchaser; and
if the purchaser is confirmed to be an authentication service subscriber transmitting the issuer server access URL information to the payment server.

* * * * *